Feb. 23, 1943.  P. S. JACKSON  2,311,987
VALVE
Filed Aug. 3, 1940  3 Sheets-Sheet 3

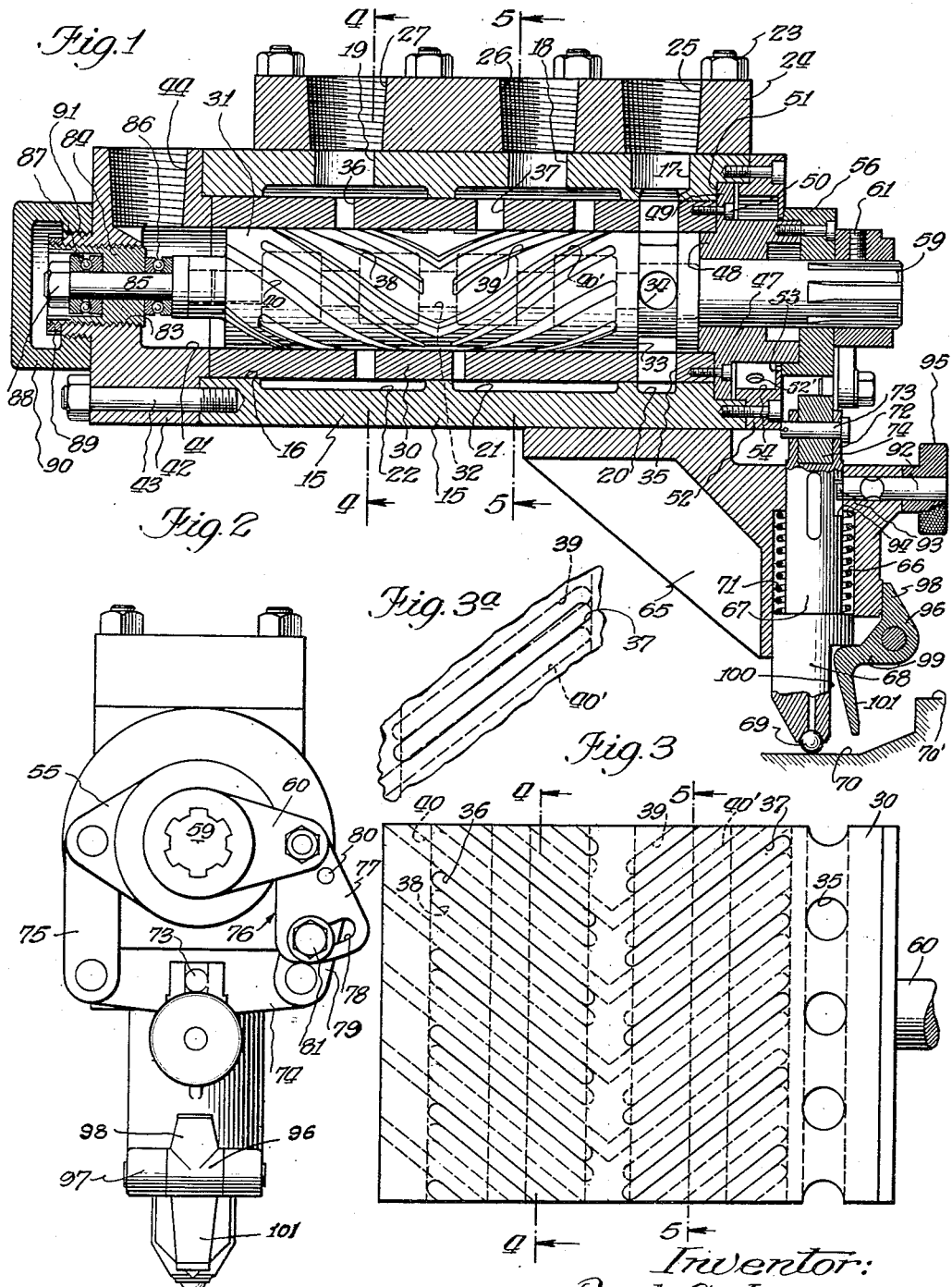

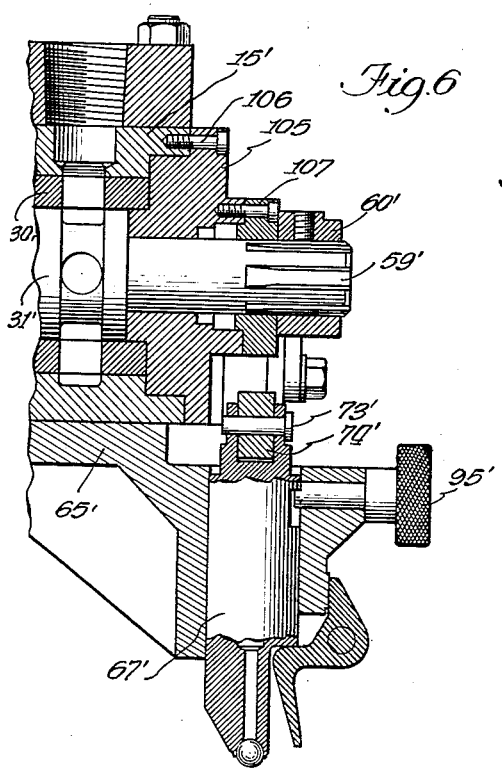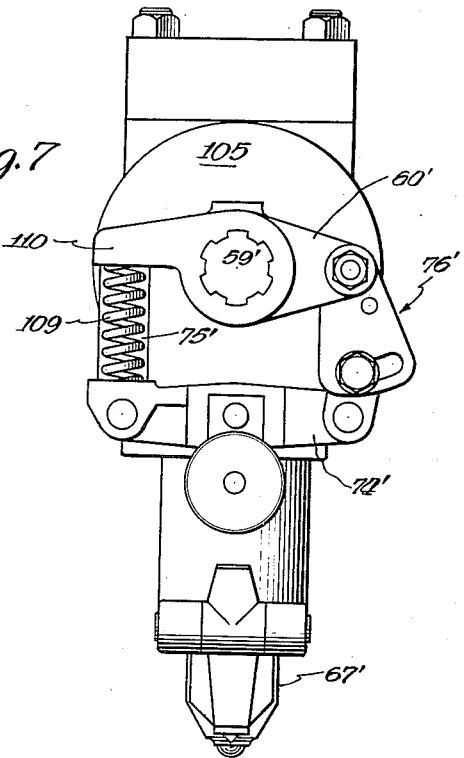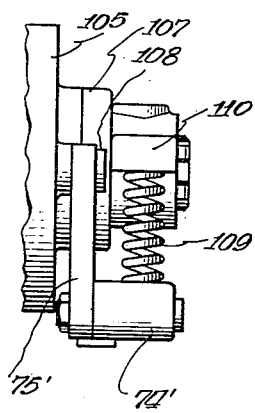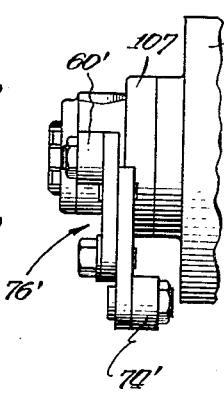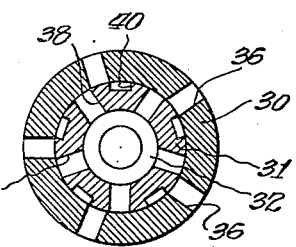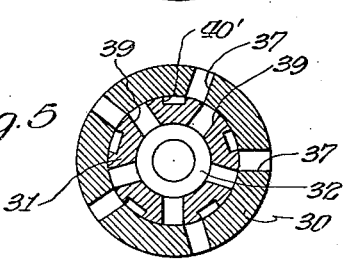

INVENTOR.
Paul S. Jackson
BY
his attorney

Patented Feb. 23, 1943

2,311,987

UNITED STATES PATENT OFFICE 2,311,987

VALVE

Paul S. Jackson, Rockford, Ill., assignor to Rockford Machine Tool Company, Rockford, Ill., a corporation of Illinois Application August 3, 1940, Serial No. 350,995

17 Claims. (Cl. 121—45)

The invention relates generally to valves and more particularly to a template operated valve, and it is a general object of the invention to provide a new and improved valve of the character described.

A more particular object is to provide a quick opening, large capacity, reversing valve embodying new and improved features of construction.

Another object is to provide a rotary type valve with helical ports.

Another object is to provide a valve having a rotary valve cylinder with helical ports therein and helical ports in the member surrounding the valve cylinder in which the valve cylinder is mounted for longitudinal adjustment to vary the overlap of the ports.

A further object is to provide a valve having a rotary valve cylinder and helical ports in the valve cylinder and in the member surrounding the cylinder with the ports in the cylinder and the member disposed at a slight angle to one another to provide an accelerated opening and a decelerated closing of the ports.

Yet a further object is to provide a reversing valve having a rotary cylinder governing the valve ports, a tracer finger for rotating the cylinder, and adjustable means between the tracer finger and the cylinder operable to vary the position of the cylinder for a given setting of the tracer finger to favor one or the other of the ports.

Another object is to provide in a valve having a ported cylinder cooperating with a ported member surrounding the cylinder to control the flow of fluid through the valve, a tracer finger operable upon movement to effect relative rotation between the cylinder and the member surrounding the same, manually operable means for shifting the tracer finger away from normal and retaining the same in shifted position to effect a permanent opening of certain ports of the valve.

Another object is to provide in a valve having a ported cylinder cooperating with a ported member surrounding the cylinder to control the flow of fluid through the valve, a tracer finger operable upon movement to effect relative rotation between the cylinder and the member surrounding the same, means carried by the valve operable upon striking an abutment to shift the tracer finger and to maintain the same shifted only so long as the means is in engagement with the abutment.

Still a further object is to provide a valve having a rotary valve cylinder, a rotary sleeve surrounding the cylinder, and means for simultaneously rotating both the cylinder and the sleeve in opposite directions to obtain a quick opening and closing of the ports formed in the sleeve and cylinder.

Other objects and advantages will become apparent from the following description taken in connection with the accompanying drawings, in which:

Fig. 1 is a vertical diametrical sectional view of a valve embodying the features of the invention.

Fig. 2 is a right end elevational view of the valve shown in Fig. 1.

Fig. 3 is a development of the valve sleeve and valve cylinder.

Figure 10:
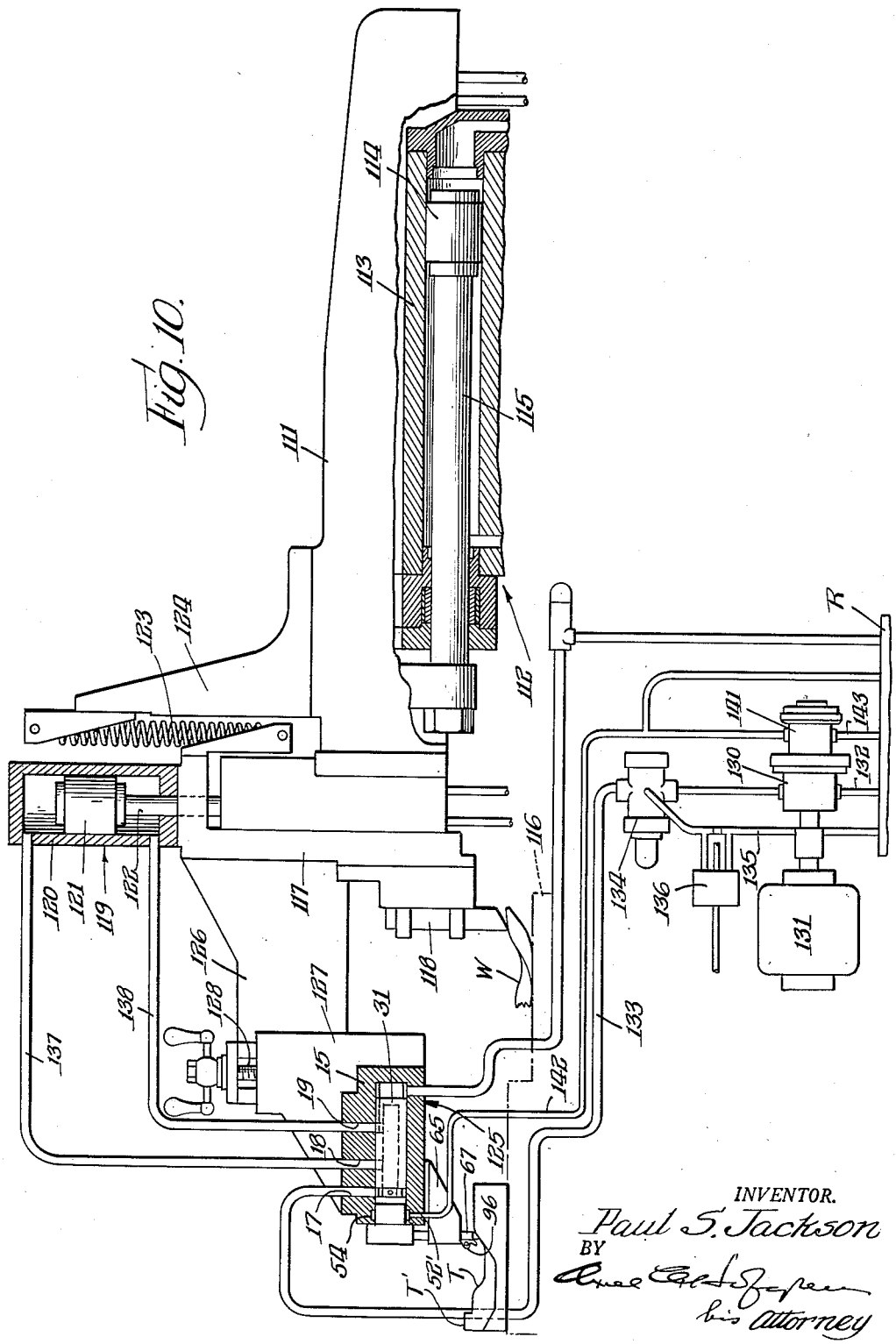

Fig. 3ª is an enlargement of the development of Fig. 3, showing only a few of the ports, better to illustrate the relative angular position thereof.

Fig. 4 is a transverse sectional view of the valve sleeve and valve cylinder only, taken approximately along the line 4—4 of Figs. 1 and 3.

Fig. 5 is a view similar to Fig. 4 but taken approximately along the line 5—5 of Figs. 1 and 3.

Fig. 6 is a fragmentary vertical diametrical sectional view of a modified form of valve.

Fig. 7 is a right end elevational view of the form of valve shown in Fig. 6.

Fig. 8 is a fragmentary elevational view taken from the left in Fig. 7.

Fig. 9 is a similar view taken from the right in Fig. 7.

Fig. 10 is a diagrammatic view showing an application of my invention to a machine tool.

While the invention is susceptible of various modifications and alternative constructions, it is shown in the drawings and will hereinafter be described in a preferred embodiment and one modification. However, it is not intended that the invention be limited thereby to the specific disclosures made, but on the contrary it is intended to cover all modifications and alternative constructions falling within the spirit and scope of the invention as defined in the appended claims.

Considering first the form of the invention shown in Figs. 1 to 5 which is the preferred form, the valve comprises an elongated housing composed in the main by a generally cylindrical casing 15 having extending longitudinally thereof a bore 16 opening through opposite ends. Opening through the sides of the casing 15 are a plurality of ports 17, 18 and 19. The first of these ports, namely, 17, communicates with the bore in the casing 15 through a shallow and comparatively narrow annular groove 20 and constitutes the intake port through which fluid under pressure is supplied to the valve. Ports 18 and 19 communicate with the bore 16, respectively, through shallow and very wide annular grooves 21 and 22, and these ports serve alternately as supply or return ports for a reversible hydraulic motor controlled by the valve. Secured to the casing 15, as by bolts 23, is a block 24 having formed therein threaded recesses 25, 26 and 27 which register, respectively, with the ports 17, 18 and 19 and constitute means for the attachment of conduits to the valve.

Within the bore of the casing 15 is an annular sleeve 30 and within the sleeve 30 is a valve cylinder 31 having a passage 32 extending longitudinally thereof. At the end opposite the port 17, the valve cylinder 31 is formed with an external annular groove 33 which communicates with the passage 32 through a plurality of radial ports 34 and which registers with a plurality of radial ports 35 formed in the sleeve 30 so as to communicate with the intake port 17. The remainder of each the sleeve 30 and the cylinder 31 is given over to ports governing the flow of fluid from the passage 32 within the valve cylinder to the ports 18 and 19.

In order to attain certain advantages which will presently become more apparent, and in order that the valve may act as a reversing valve, the sleeve 30 is formed with a first set of ports taking the form of a plurality of parallel elongated slots 36 cut completely through the sleeve. These slots spiral about the sleeve to form helical ports and are spaced uniformly about the sleeve. A second set of ports is composed of similar slots 37 which, however, spiral in the opposite direction and, moreover, are offset angularly the appropriate amount necessary to make the valve function as a reversing valve, herein about one-tenth revolution. A plurality of such slots 36 and 37 are employed so as to increase the volume of fluid which may flow through the valve.

Correspondingly, the valve cylinder 31 has a first and a second set of ports taking the form of parallel, elongated slots 38 and 39, respectively, cut completely through the cylinder to communicate with passage 32 and thus constitute supply or pressure ports. The slots 38 and 39 are also helical and extend generally parallel with their cooperating slots 36 and 37 formed in the sleeve 30, that is, slots 38 and 39 spiral in opposite directions about the valve. Milled in the outer surface of the cylinder 31 between the slots 38 are a plurality of grooves 40 extending parallel with the slots 38 and between the slots 39 are grooves 40' extending parallel with the slots 39. Unlike the slots 38 and 39, which are independent of one another, the grooves 40 and 40' join at their inner ends to form a continuous groove, and grooves 40 moreover open through the end of the cylinder 31 to discharge to an exhaust chamber 41 formed in major part by a cup-shaped member 42. This member is secured over the end of the casing 15 by bolts 43 to close the same. Opening through the side of the member 42 is a port 44 threaded for the reception of a suitable fluid exhaust or return conduit.

As can be readily understood from the foregoing description, and as can easily be seen from a consideration of Figs. 3, 4 and 5, the valve has a neutral or closed position in which none of the slots 36 or 37 registers with any of the slots 38 and 39 or the grooves 40 and 40'. No flow of fluid, therefore can take place. With relative rotation between the sleeve 30 and the cylinder 31, however, the ports 36 and 37 are brought into registry with the ports in the cylinder. With relative rotation in one direction, the ports 36 register with slots 38 so that pressure fluid is supplied to port 19 while ports 37 register with grooves 40' to take care of fluid returning through port 18. Conversely, upon relative rotation in the opposite direction, port 18 becomes a supply or discharge port, while 19 becomes a return port.

One of the advantages of the valve disclosed herein is its ability to pass large quantities of fluid yet to have a quick opening and closing. In order, however, that the fluid may not be turned on and off so suddenly as to cause chattering of the mechanism with which the valve is associated, the ports in the sleeve 30 are not precisely parallel with the ports in the cylinder 31, but are disposed at a very slight angle thereto (see Fig. 3ª). Thus, as can be clearly seen from Fig. 3ª, a port is not opened or closed simultaneously throughout its entire length, but the initial opening or the final closing progresses from end to end.

To obtain maximum rates of port opening and closing, both the sleeve 30 and the cylinder 31 are rotatable in this preferred form. In order that both may be independently actuated from a point externally of the valve casing, the sleeve 30 has bolted to one end thereof an annular member 47 having a hub portion 48 received in the sleeve, and a radially outwardly projecting flange 49. The flange 49 provides a convenient area through which bolts 50 securing the member to the sleeve may be passed and also extends radially outwardly beyond the sleeve 30 to engage a shoulder 51 formed in the end of the casing 15. Surrounding the member 47 is an annular ring 52 which is bolted to the casing 15 and bears against the flange 49 to retain the sleeve against endwise movement. An inturned flange 53 on the ring forms with the member 47 an annular space 54 for trapping leakage fluid. Opening through the ring 52 is a port 52' adapted for the attachment of a suction conduit 142 (Fig. 10) for the removal of trapped leakage fluid as described more fully hereinafter. Outwardly of the member 47 is a lever 55 having an annular hub portion 56 bolted to the member 47 to complete the actuating means for the sleeve 30. The prompt and complete withdrawal of leakage fluid is desirable to prevent the same from falling on the template, for even the thickness of a film of oil would destroy the accuracy of the valve.

The cylinder 31 has a shaft-like extension 59 which projects rotatably through the member 47 and the hub 56 of the lever 55. At its projecting end the extension is splined to receive non-rotatably a lever 60 by which the cylinder is rotated. The lever 60 is retained against movement off the end of the extension by a set screw 61.

The valve herein is particularly adapted for governing the hydraulic circuit of pattern controlled machines. Accordingly, the valve includes tracer means for effecting the rotation of the sleeve 30 and the cylinder 31. Depending from the valve casing 15 is a bracket 65 having a bore 66 therein in which is reciprocably mounted a tracer finger 67. The tracer finger 67 is adapted to project at both ends from the bore and at its outer end has an enlarged head 68 which terminates in a point the very tip of which is preferably formed by a ball 69 of hardened material, which ball forms the point of contact with a master template 70, the contour of which is to be reproduced. The tracer finger 67 is urged outwardly so as to maintain its contact with the template 70 by a compression spring 71 which encircles the finger and bears at one end against an annular shoulder formed by the head 68, and at the other end bears against an annular shoulder formed in the bracket 65 by a reduction in the diameter of the bore 66.

At its inner end, the finger 67 is bifurcated, and received between the bifurcations 72 and retained therebetween by a pin 73 is a bar 74 extending transversely of the valve. One end of the bar is connected by a link 75 to the lever 55 rigid with the sleeve 38, while the other end of the bar 74 is connected by suitable linkage, generally designated 76, to the lever 60 which is non-rotatably mounted on the extension 59 of the cylinder 31. It will be seen, therefore, that with the slightest movement of the tracer finger 67 both the sleeve 38 and the cylinder 31 will be rotated and will, moreover, be rotated in opposite directions so as to result in a port opening at twice the rate that would be effected by the rotation of either the cylinder or the sleeve alone. Thus, should the template 70 cause the finger 67 to move upwardly from a neutral position in which it is shown, the lever 55 would be rotated in a clockwise direction, as viewed in Fig. 2, while the lever 60 would be rotated in a counter-clockwise direction. Such rotation of the levers would, of course, impart like rotation to the sleeve 38 and the cylinder 31 which, as best seen in Figs. 4 and 5, would cause the ports 36 in the sleeve to register with the return grooves 40 in the cylinder, making of the port 19 a return port, while the ports 37 in the other half of the sleeve (see Fig. 5) would register with the grooves 39, making of the port 18 a pressure or supply port furnishing fluid to a hydraulic motor causing the tool to be raised an amount corresponding to the movement of the tracer finger 67.

To facilitate ready understanding of the invention there is illustrated in Fig. 10 a preferred form thereof as applied to a shaper of the kind disclosed and claimed in my Patent No. 2,223,038, dated November 26, 1940. Such a shaper has a horizontally disposed, longitudinally reciprocable tool carrying slide or ram 111 driven by a hydraulic motor 112 of the reciprocatory type comprising a cylinder 113 fixed in the bed or frame of the shaper, and a piston 114 whose connecting rod 115 projects through the forward end of the cylinder 113 and is secured at its projecting end to the slide 111. Through a suitable hydraulic circuit including a pressure generating pump and control valves all fully disclosed in my above mentioned patent, the slide 111 is continuously reciprocated, once operation of the shaper is initiated, to move through a forward or cutting stroke and a return stroke repeatedly.

Disposed at the front of the shaper and beneath the slide 111 is a table 116 which, in the present instance, constitutes a support for both a template T and a work blank W which is to be machined to conform to the template T. This table is indexable transversely of the shaper so as to present a new portion of the work to the tool after each cutting stroke of the slide 111. Such indexing of the table is effected automatically to take place after the completion of one cutting stroke and before the commencement of the new cutting stroke, all as described in my above mentioned patent.

Mounted on the forward end of the slide 111 is a tool slide 117 adapted to carry a cutting tool 118. In the present instance, this tool slide is mounted for vertical movement and is adapted to be moved through the medium of a hydraulic motor 119 of the reciprocatory type comprising a cylinder 120 rigid with the slide 117 and a piston 121 having the projecting end of its piston rod 122 fixed in the main slide 111. Serving partially to counter-balance the weight of the slide 117 is a tension spring 123 secured at one end to the slide 117, and secured at the other end to an upwardly extending bracket 124 of the slide 111.

Operating fluid is supplied to the motor 119 by a hydraulic circuit which includes the tracer valve of Figs. 1 to 5, indicated as 125. This valve is mounted to partake of the same movement as the tool slide 117 and to that end the slide 117 has a forwardly projecting extension 126 supporting on its free end a slide 127 in which the valve 125 is carried. In order that the valve 125 may be adjusted relative to the tool 118, the slide 127 is vertically movable and may be adjusted through a conventional adjusting screw 128.

In addition to the tracer valve 125, the hydraulic circuit comprises a main pressure pump 130 driven from an electric motor 131. The pump 130 draws fluid from a tank or reservoir R through a conduit 132 and discharges the pressure fluid through a conduit 133 which leads to the intake port 17 of the valve 125. Interposed in the conduit 133 is a relief valve 134 which has leading therefrom a by-pass return conduit 135 through which excess fluid is returned to the reservoir when the pressure in the conduit 133 exceeds a predetermined value. A cooler 136 may be connected to the conduit 135 in conventional manner to cool the fluid.

Valve 125 has its port 18 connected to the head end of the tool slide actuating motor 119 by a conduit 137, while the rod end of the motor 119 is connected by a conduit 138 with the port 19 of the valve. It is to be noted in this connection that the motor 119 is so arranged that the larger pressure area of the piston 121 serves to effect a raising of the slide 117 so that the pressure differential between the head and rod ends of the motor may be utilized to aid in counter-balancing the weight of the slide 117 and the parts carried thereby. Exhaust fluid is returned from the valve to the reservoir R through a conduit 139 connected at one end to the port 44 and discharging at the other end to the reservoir R. Preferably interposed in this return conduit is a back pressure valve 140.

Also driven from the motor 131 is an auxiliary pump 141 which is a small suction pump. This pump has connected to its intake side a conduit 142 which is connected to the port 52' of the valve 125 for the purpose not only of withdrawing leakage fluid trapped in the chamber 54, but for actually maintaining slight suction in the chamber so as to preclude all possibility of a building up of pressure within the valve by leakage fluid. A conduit 143 leads from the discharge side of the pump 141 to the reservoir R. In order to maintain the suction of the pump 141, a conduit 144 is connected at one end to the conduit 142 and at the other end is connected with the reservoir so that fluid may be continuously circulated through the pump 141.

It will be evident that the tracer valve is mounted to move with the tool so that at the time the tool is raised a proper amount the tracer finger will again be in neutral position and the sleeve and the cylinder will have returned to the position shown in Figs. 4 and 5 cutting off the supply of operating fluid. Conversely, should the tracer finger 67 drop from its neutral position, the levers 55 and 60 would be rotated in a counter-clockwise and clockwise direction, respectively, and the sleeve and the cylinder would be given a corresponding rotation. Under those conditions, the ports 36 in the sleeve would register with the grooves 38 in the cylinder, making of the port 19 a pressure port, while the ports 37 in the other half of the sleeve would register with the grooves 40' to make of the port 18 a return port.

The valve herein is provided with certain adjustments which, in conjunction with the helical character of the ports, serves to permit such setting of the valve as will aid in counter-balancing the mechanism controlled thereby, and for other proper setting and operation of the mechanism. To that end, the linkage 76 is made adjustable and comprises a somewhat triangular shaped link 77 which is pivotally connected at its apex to the lever 60 and near its base is formed with an arcuate slot 78. Cooperating with the link 77 is a link 79 pivotally connected at one end to an end of the bar 74, and pivotally connected at its other end through the medium of a pin 80 to the link 77 near its point of connection to the lever 60 and to one side of the center line of the link. Carried by the link 79 and projecting through the slot 78 is a bolt 81 which may be loosened to permit swinging of the links relative to one another and thereafter tightened to retain the links in adjusted position. This adjustment makes possible the variation in the counter-balancing effect on the tool actuating motor of the fluid flowing through the valve. Thus, if it be assumed that port 18 leads to that end of the hydraulic motor which serves to support or raise the tool, the valve may be appropriately adjusted to effect an increasing or decreasing counter-balancing effect. This is best understood from a consideration of Fig. 3. For any given setting of the tracer finger 67, if the linkage 76 is adjusted so as to increase its effective length, the lever 60 and hence the cylinder will be rotated in a counter-clockwise direction, as viewed in Fig. 2, which is downwardly, as viewed in the development of Fig. 3. With such downward movement of the cylinder, the pressure ports 39 will be moved toward the ports 37 in the sleeve, while the pressure ports 38 in the left half of the cylinder will be moved away from the ports 36. Thus it will be seen that, for any given movement of the tracer finger 67 above or below its normal position, the ports 37 and 39 will come into registry sooner or have a greater registry, if indeed they are not in registry when the tracer finger is in its neutral position, with an up movement of the finger than the ports 36 and 38 for a corresponding downward movement of the finger.

Means is also provided for adjusting the cylinder longitudinally relative to the sleeve 30. To that end, the cup-shaped member 42 has formed therein a threaded bore 83 in the bottom thereof in which is threadedly received a plug 84. The cylinder 31 has a reduced rod-like extension 85 which passes through and by means of which the cylinder is secured to the plug 84. In order that the cylinder, though attached to the plug, may be freely rotatable, there is interposed between the cylinder and the plug a ball bearing 86 and a similar ball bearing 87 is interposed between the plug and a nut 88 threaded onto the extension 85, and by means of which the cylinder is secured to the plug 84 to partake of the axial movement of the plug. A lock nut 89 secures the plug in adjusted position, and the adjusting mechanism is protected against injury and accidental shifting by a cap 90 threaded onto a hub-like flange 91 projecting outwardly from the member 42. It will be apparent that by rotation of the plug 84 the cylinder 31 will be moved axially relative to the sleeve 30. As best seen from the development of Fig. 3, such axial shifting of the cylinder relative to the sleeve for any given setting of the valve and tracer finger will cause a greater or lesser overlap between the ports in the sleeve and either both pressure ports in the cylinder or both return grooves, depending upon in which direction the shift is made.

Means is provided for manually raising and holding the tracer finger 67 above its neutral position, so as to cause the valve to remain in an open position. To that end, there is rotatably journaled in the bracket 65 a shaft 92. This shaft at its inner end carries an eccentrically mounted nub 93 which projects into the reduced portion of the bore 66 and into a slot 94 formed in the tracer finger 67. At its outer end the shaft 92 carries a knurled hand knob 95. Normally the shaft is rotated to the position shown in Fig. 1, in which the nub 93 merely serves as a limit for the movements, particularly the outward movement of the tracer finger 67. When rotated through 180°, however, the nub 93 shifts the tracer finger inwardly and holds the same there, thereby rotating the sleeve 30 in a clockwise direction, as viewed in Fig. 5, and the cylinder 31 in a counter-clockwise direction, causing a registration of ports 37 and 39. Pressure fluid is thus supplied to the port 18 until the shaft 92 is manually rotated to restore the tracer finger to normal, freely operative position.

Means is also provided for automatically raising and holding the tracer finger 67 above its neutral position for a limited time. This means takes the form of a crank 96 pivotally mounted between ears 97 formed on the bracket 65 and having a first leg 98 adapted to abut the bracket 65 to limit the counter-clockwise rotation of the crank, and a second leg 99 which projects into a notch 100 cut in the tracer finger 67. Projecting downwardly and outwardly from the end of the leg 99 is a finger 101 which, upon striking an abutment on the template such as indicated at 70' during the movement of the tracer finger across the template, will pivot the crank in a clockwise direction as viewed in Fig. 1, and as a result will raise the tracer finger 67. Such raising of the tracer finger will, of course, rotate the sleeve and cylinder of the valve to open the ports therein. Normally the valve is so connected that raising of the tracer finger will cause a like raising movement of the tool. Hence the abutment 70' on the template is normally so positioned that it will be struck by the finger 101 at the end of the cutting stroke of the tool and frequently when the tool comes to a hub or the like, so that it will be raised to clear itself from the chips cut by it. Occurring at the end of the stroke, the crank is, of course, pivoted until a reversal takes place, after which time the tracer finger again is freed to the control of the template proper. In addition to clearing the tool from the chips which it has cut, this construction has the advantage that it raises the tool out of contact with the work during the return stroke.

Turning now to a consideration of the modified form disclosed in Figs. 6 to 9, the construction is the same as that of the preferred form, save that the sleeve 30' is stationary instead of rotatable, and consequently the closure means for the right or tracer end of the casing is somewhat different. As best seen in Fig. 6, the valve still comprises a cylindrical casing 15' having a longitudinal bore in which is received the sleeve 30' which, however, is stationary instead of rotatable and rotatable within the sleeve is the cylinder 31'. All of the porting is the same as that of the preferred form and cylinder 31' is still formed with an extension 59' splined at its outer end to receive non-rotatably a lever 60'. Surrounding the extension 59' to form a closure for the end of the casing 15', however, is a single member 105 which is approximately equal to and of the same shape as the combined member 47 and ring 52 of the preferred form. The member 105 is secured to the end of the casing by bolts 106, and in turn bolted to the member 105 is a ring 107 operating further to prevent leakage along the extension 59'.

The cylinder 31' is still rotated through a tracer finger 67' reciprocably mounted in a bracket 65'. The tracer finger 67' has a bifurcated inner end to which is secured by a pin 73' a bar 74' extending transversely of the cylinder. One end of the bar 74' is still connected by means of adjustable linkage 76' to the end of the lever 60'. The other end of the bar 74' has pivotally connected thereto a link 75' which, however, instead of being connected to rotate the sleeve 30' is pivoted on a stud 108 projecting from the member 105. The compression spring 71 surrounding the tracer finger in the preferred form is in this modified form replaced by a compression spring 109 bearing at one end against the end of the bar 74' to which the link 75' is connected and at the other end bearing against a lever 110 integral with the lever 60', but extending in a diametrically opposite direction.

It is believed apparent from the foregoing description that, as the tracer finger 67' moves inwardly or outwardly, only the cylinder 31' will be rotated and hence the rate of opening or closing of the ports will be less than the rate of the preferred form. However, in other respects the modified form of valve operates the same, is capable of the same adjustments so as to permit of a setting aiding in the counter-balancing of the tool head which is actuated by the fluid controlled by the valve, and in the operation of the mechanism generally.

It is believed apparent from the description that I have perfected a valve of unique construction having many advantageous features and one which is particularly well adapted for use in governing the hydraulic circuit of a pattern controlled machine tool. These advantages result in whole or in part from the provision of the type of ports employed, particularly from the provision of helical ports. It is the provision of helical ports which combined with an axial adjustment of the cylinder makes possible a variation in the degree of overlap of the ports in the sleeve and the cylinder. It is also partially due to the helical ports and partially to the adjustable linkage that the valve may be set to effect a counter-balancing of the tool head governed by the valve. By making both the sleeve and the cylinder rotatable, I have greatly increased the rate of port opening of the valve and thus have made the same much more sensitive to movements of the tracer finger which in turn provides a more accurate and prompt response of the tool head.

I claim as my invention:

1. A valve comprising, in combination, a casing having a bore extending longitudinally thereof, a pair of ports opening through the side wall of said casing to the bore therein, an annular sleeve in the bore having a first elongated slot cut therethrough providing a port effecting communication with one of the ports in said casing and the interior of said sleeve, said slot extending helically about said sleeve, a second slot cut through said sleeve to provide a port effecting communication between the interior of said sleeve and the other of said ports in said casing, said second slot also extending helically about said sleeve but in a direction opposite to that of said first slot, a cylinder in said sleeve having an axial passage for pressure fluid, said cylinder and said sleeve being relatively rotatable, a first elongated helical slot cut through said cylinder and extending generally parallel with the first slot in said sleeve, a second elongated helical slot in said cylinder extending generally parallel with the second slot in said sleeve, and a groove milled in the outer surface of said cylinder having portions disposed parallel with said slots in said cylinder and opening through one end of said cylinder to form a return fluid port, the oppositely spiraling ports in one said sleeve or said cylinder being offset angularly.

2. A valve comprising, in combination, a casing having a bore extending longitudinally thereof, a pair of ports opening through the side wall of said casing to the bore therein, an annular sleeve in the bore having a first elongated slot cut therethrough providing a port effecting communication with one of the ports in said casing and the interior of said sleeve, said slot extending helically about said sleeve, a second slot cut through said sleeve to provide a port effecting communication between the interior of said sleeve and the other of said ports in said casing, said second slot also extending helically about said sleeve but in a direction opposite to that of said first slot, a cylinder in said sleeve having an axial passage for pressure fluid, said cylinder and said sleeve being relatively rotatable, a first elongated helical slot cut through said cylinder and extending generally parallel with the first slot in said sleeve, a second elongated helical slot in said cylinder extending generally parallel with the second slot in said sleeve, a groove milled in the outer surface of said cylinder having portions disposed parallel with said slots in said cylinder and opening through one end of said cylinder to form a return fluid port, the oppositely spiraling ports in one said sleeve or said cylinder being offset angularly, and means for effecting a relative axial adjustment between said sleeve and cylinder.

3. A valve comprising, in combination, a casing having a bore extending longitudinally thereof, a pair of ports opening through the side wall of said casing to the bore therein, an annular sleeve in the bore having a first elongated slot cut therethrough providing a port effecting communication with one of the ports in said casing and the interior of said sleeve, said slot extending helically about said sleeve, a second slot cut through said sleeve to provide a port effecting communication between the interior of said sleeve and the other of said ports in said casing, said second slot also extending helically about said sleeve but in a direction opposite to that of said first slot, a cylinder in said sleeve having an axial passage for pressure fluid, said cylinder and said sleeve being relatively rotatable, a first elongated helical slot cut through said cylinder and extending generally parallel with the first slot in said sleeve, a second elongated helical slot in said cylinder extending generally parallel with the second slot in said sleeve, a groove milled in the outer surface of said cylinder having portions disposed parallel with said slots in said cylinder and opening through one end of said cylinder to form a return fluid port, the oppositely spiraling ports in one said sleeve or said cylinder being offset angularly, and means for effecting relative rotation between said sleeve and said cylinder.

4. A valve comprising, in combination, a casing having a bore extending longitudinally thereof, a pair of ports opening through the side wall of said casing to the bore therein, an annular sleeve rotatably mounted in the bore having a first elongated slot cut therethrough providing a port effecting communication with one of the ports in said casing and the interior of said sleeve, said slot extending helically about said sleeve, a second slot cut through said sleeve to provide a port effecting communication between the interior of said sleeve and the other of said ports in said casing, said second slot also extending helically about said sleeve but in a direction opposite to that of said first slot, a cylinder rotatably mounted in said sleeve having an axial passage for pressure fluid, a first elongated helical slot cut through said cylinder and extending generally parallel with the first slot in said sleeve, a second elongated helical slot in said cylinder extending generally parallel with the second slot in said sleeve, a groove milled in the outer surface of said cylinder having portions disposed parallel with said slots in said cylinder and opening through one end of said cylinder to form a return fluid port, the oppositely spiraling ports in one said sleeve or said cylinder being offset angularly, and means for simultaneously effecting rotation of both said sleeve and said cylinder in opposite directions.

5. A valve comprising, in combination, a casing having a bore extending longitudinally thereof, a pair of ports opening through the side wall of said casing to the bore therein, an annular sleeve rotatably mounted in the bore having a first elongated slot cut therethrough providing a port effecting communication with one of the ports in said casing and the interior of said sleeve, said slot extending helically about said sleeve, a second slot cut through said sleeve to provide a port effecting communication between the interior of said sleeve and the other of said ports in said casing, said second slot also extending helically about said sleeve but in a direction opposite to that of said first slot, a cylinder rotatably mounted in said sleeve having an axial passage for pressure fluid, a first elongated helical slot cut through said cylinder and extending generally parallel with the first slot in said sleeve, a second elongated helical slot in said cylinder extending generally parallel with the second slot in said sleeve, a groove milled in the outer surface of said cylinder having portions disposed parallel with said slots in said cylinder and opening through one end of said cylinder to form a return fluid port, the oppositely spiraling ports in one said sleeve or said cylinder being offset angularly, and means for rotating said sleeve and said cylinder simultaneously in opposite directions comprising a lever rigid with said cylinder, a lever rigid with said sleeve, a reciprocably mounted control element, and linkage connecting said control element with said levers.

6. A valve comprising, in combination, a casing having a bore extending longitudinally thereof, a pair of ports opening through the side wall of said casing to the bore therein, an annular sleeve rotatably mounted in the bore having a first elongated slot cut therethrough providing a port effecting communication with one of the ports in said casing and the interior of said sleeve, said slot extending helically about said sleeve, a second slot cut through said sleeve to provide a port effecting communication between the interior of said sleeve and the other of said ports in said casing, said second slot also extending helically about said sleeve but in a direction opposite to that of said first slot, a cylinder rotatably mounted in said sleeve having an axial passage for pressure fluid, a first elongated helical slot cut through said cylinder and extending generally parallel with the first slot in said sleeve, a second elongated helical slot in said cylinder extending generally parallel with the second slot in said sleeve, a groove milled in the outer surface of said cylinder having portions disposed parallel with said slots in said cylinder and opening through one end of said cylinder to form a return fluid port, the oppositely spiraling ports in one said sleeve or said cylinder being offset angularly, and means for rotating said sleeve and said cylinder simultaneously in opposite directions comprising a lever rigid with said cylinder, a lever rigid with said sleeve, a reciprocably mounted control element, a link connecting said control element and said sleeve lever, and linkage connecting said control element and said cylinder lever, said linkage being adjustable to rotate said cylinder to different positions for a given setting of said control element.

7. A valve comprising, in combination, a casing having a longitudinal bore opening through one end thereof, a pair of ports opening through the side wall of said casing to the bore therein, an annular sleeve in the bore having a first elongated slot cut therethrough providing a port effecting communication with one of the ports in said casing and the interior of said sleeve, said slot extending helically about said sleeve, a second slot cut through said sleeve to provide a port effecting communication between the interior of said sleeve and the other of said ports in said casing, said second slot also extending helically about said sleeve but in a direction opposite to that of said first slot, a cup-shaped member closing the open end of said casing and the corresponding end of said sleeve, said member having a discharge port leading from the interior thereof and a threaded bore in the bottom thereof, a cylinder in said sleeve having an axial passage for pressure fluid, said cylinder and said sleeve being relatively rotatable, a first elongated helical slot cut through said cylinder and extending generally parallel with the first slot in said sleeve, a second elongated helical slot in said cylinder extending generally parallel with the second slot in said sleeve, a groove milled in the outer surface of said cylinder having portions disposed parallel with said slots in said cylinder and opening through the end of said cylinder to form a return fluid port discharging to said cup-shaped member, the oppositely spiraling ports in one said sleeve or said cylinder being offset angularly, and means for adjusting said cylinder axially relative to said sleeve comprising a plug threaded into the bore in said cup-shaped member and an extension of said cylinder projecting through said plug and secured to said plug for axial movement therewith while permitting rotational movement relative thereto.

8. In a reversing valve of the rotary type, a first member having a pair of elongated helical ports formed therein spiraling in opposite directions and offset angularly with respect to one another, a second cooperating member rotatable relative thereto having formed therein extending generally parallel with the ports in said first member two elongated helical ports for each of the ports in said first member, and means for adjusting said members axially relative to one another to vary the overlap of said ports.

9. A valve comprising, in combination, a casing having a bore extending longitudinally thereof, a first and a second port opening through said casing to the bore therein, an annular sleeve mounted in the bore in said casing, a plurality of parallel helical and circumferentially spaced slots cut in one-half of said sleeve to provide communication between one of said ports and the interior of said sleeve, a plurality of parallel helical and circumferentially spaced slots cut in the remaining half of said sleeve to provide communication between the other of said ports and the interior of said sleeve, said last mentioned slots spiraling in the opposite direction from said first mentioned slots and offset angularly from said first mentioned slots, a third port communicating with the interior of said sleeve at one end, a hollow cylinder within said sleeve with said sleeve and said cylinder mounted for relative rotational movement, a port for the supply of pressure fluid to the interior of said cylinder, a plurality of parallel helical and circumferentially spaced slots formed in one-half of said cylinder, said slots being generally parallel with the first mentioned slots in said sleeve, a plurality of parallel helical and circumferentially spaced slots in the other half of said cylinder, said last mentioned slots being generally parallel with the second mentioned slots in said sleeve, and a plurality of grooves milled in the outer surface of said cylinder and opening through the end of said cylinder to form discharge ports communicating with said third port, said grooves having portions disposed intermediate said slots in said cylinder and extending parallel therewith.

10. In a valve of the rotary type, a first member having a pair of ports formed therein spaced longitudinally of the valve, a cylinder mounted within said first member for relative rotation therewith, said cylinder having a discharge and a return port for each of the ports in said first member, a control element reciprocably mounted, and linkage connecting said element and said cylinder to convert the reciprocatory motion of said element into rotary motion of said cylinder, said linkage comprising a lever rotatable with said cylinder, a first triangularly shaped link pivotally connected at its apex to the end of said lever and having an arcuate slot near its base, a second link pivotally connected at one end on means carried by the control element and pivotally connected at its other end to said first link at a point intermediate the slot therein and the point of attachment to said lever, and a bolt carried by said second link and projecting through the slot in said first link operating when tightened to clamp the linkage in adjusting position.

11. In a valve of the rotary type, a valve casing, a first member in said casing having a pair of ports therein spaced longitudinally of the casing, a cylinder in said first member having a supply and return port formed therein for each port in said first member, said cylinder and said first member being relatively rotatable, a bracket secured to said valve casing, a control element reciprocable in said bracket, means connected to said control element operable to convert the reciprocatory motion thereof into relative rotary motion between said cylinder and said first member, and manual means cooperating with said control element operable to shift and maintain said element shifted to a position in which the valve ports are open.

12. In a valve of the rotary type, a valve casing, a first member in said casing having a pair of ports therein spaced longitudinally of the casing, a cylinder in said first member having a supply and return port formed therein for each port in said first member, said cylinder and said first member being relatively rotatable, a bracket secured to said valve casing, a control element reciprocable in said bracket, means connected to said control element operable to convert the reciprocatory motion thereof into relative rotary motion between said cylinder and said first member, and means movably mounted on said bracket and cooperating with said control element and operable when moved in one direction to shift said control element.

13. A valve comprising, in combination, a casing having a bore therein opening through one end thereof, a cylinder rotatably mounted in the bore in said casing, ports in said casing and in said cylinder controlling the flow of fluid through the valve, said cylinder having an extension projecting axially from the open end of said bore outwardly of the casing for rotation from an external source, closure means surrounding the extension of said cylinder and secured to said casing to close the end thereof, said closure means having an annular pocket formed therein for the trapping of leakage fluid, and a port leading from said pocket for the reception of a suction conduit.

14. A valve comprising, in combination, a casing having a longitudinal bore therein opening through one end thereof, an annular sleeve rotatably mounted in the bore, a cylinder rotatably mounted in the sleeve, said cylinder having an axial passage adapted to be supplied with fluid under pressure and said sleeve and said cylinder being formed with cooperating ports controlling the flow of fluid through the valve, an extension of reduced diameter projecting from said cylinder outwardly through the open end of said casing, an annular member surrounding said extension and extending radially outwardly beyond said sleeve, said member being non-rotatably secured to said sleeve, an annular ring surrounding said annular member secured to said casing, said ring being in radially spaced relation to said annular member and having an inwardly extending annular flange contacting said annular member to form an annular chamber for the trapping of leakage fluid, and a port leading from said annular chamber for the reception of a suction conduit.

15. A valve comprising, in combination, a housing having a longitudinal bore therein, a helical port opening to the bore in said housing, a valve cylinder mounted in said bore, said housing and said cylinder being relatively rotatable, and a helical port formed in said cylinder and adapted to cooperate with said first mentioned helical port to control the flow of fluid through the valve, said ports departing slightly from a true parallel with one another to close or open progressively from one end to the other.

16. In a valve of the rotary type, a casing having a longitudinal bore opening through one end thereof, a ported annular sleeve fast in the bore of said casing, a member forming an end closure for the bore in said casing and said annular sleeve, a ported cylinder rotatable in said sleeve, having a stem projecting outwardly through said closure member, a control element reciprocably mounted for movement transversely of said stem, and means connecting said element and said cylinder to convert the reciprocatory motion of said element into rotary motion of said cylinder comprising a lever on said stem, a bar carried by said element, linkage connected between one end of said bar and said lever, and spring means acting on said bar to urge said element in one direction.

17. In a valve of the rotary type, a casing having a longitudinal bore opening through one end thereof, a ported annular sleeve fast in the bore of said casing, a member forming an end closure for the bore in said casing and said annular sleeve, a ported cylinder rotatable in said sleeve, having a stem projecting outwardly through said closure member, a control element reciprocably mounted for movement transversely of said stem, and means connecting said finger and said cylinder to convert the reciprocatory motion of said element into rotary motion of said cylinder comprising a double armed lever on said stem extending diametrically thereof, a bar pivoted intermediate its ends on the inner end of said element, linkage connected between one end of said bar and one arm of said lever, a link connected between the other end of said bar and said closure member, and a compression spring acting between the other arm of said lever and the adjacent end of said bar.

PAUL S. JACKSON.